Oct. 14, 1947.                F. T. SMITH                2,428,857
                              LAND LEVELER
                           Filed April 12, 1946         3 Sheets-Sheet 2
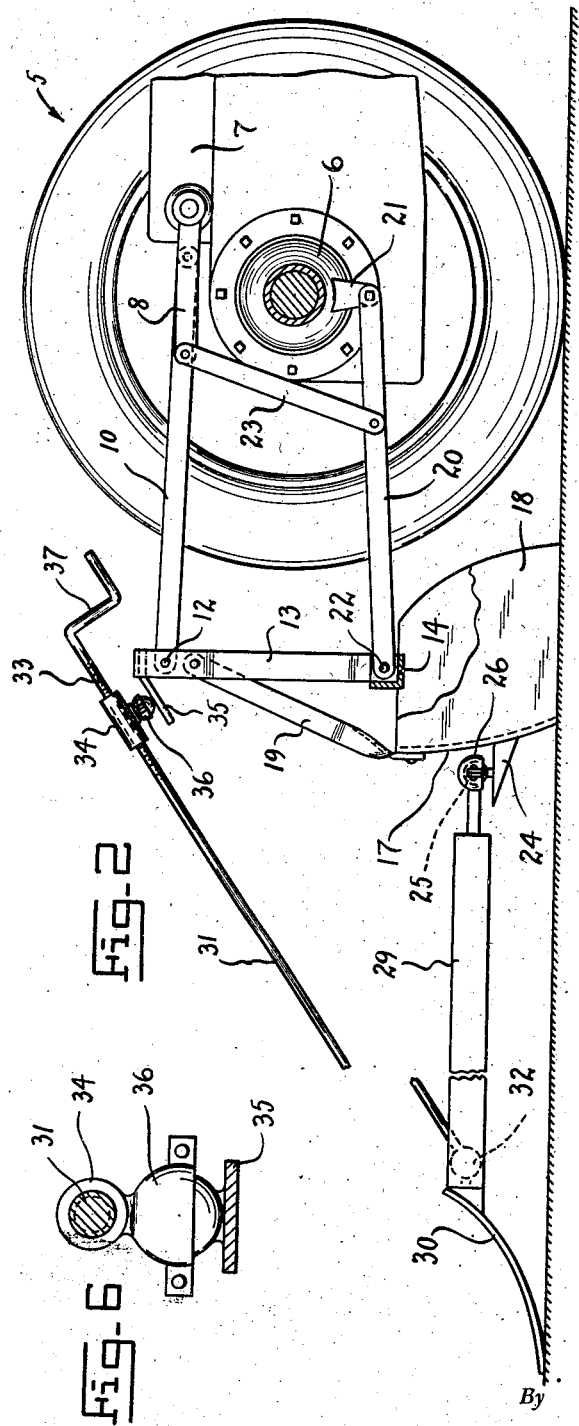
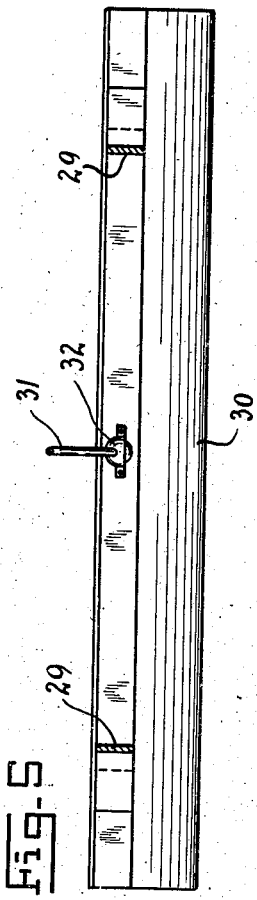
Inventor
Fred T. Smith
By

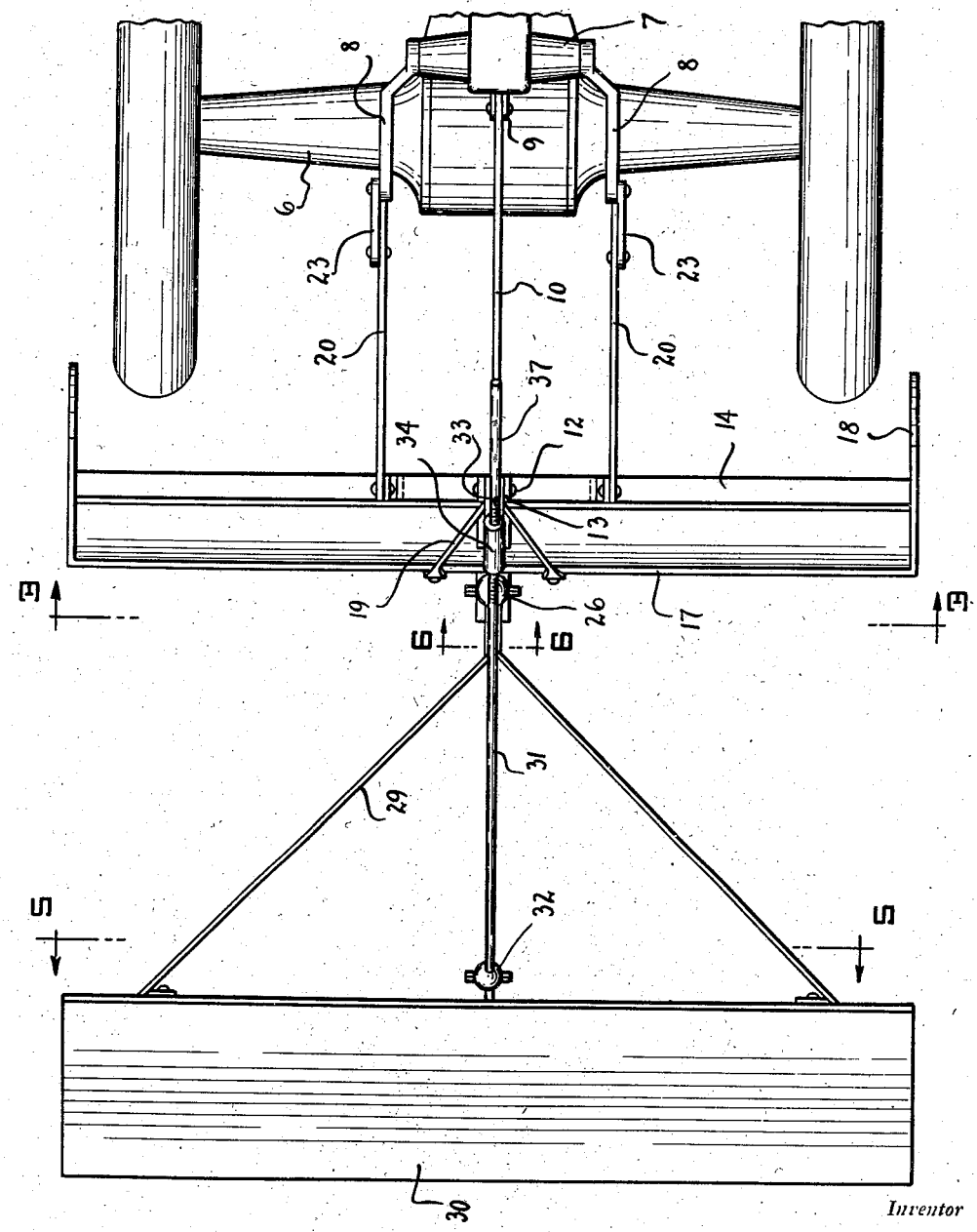

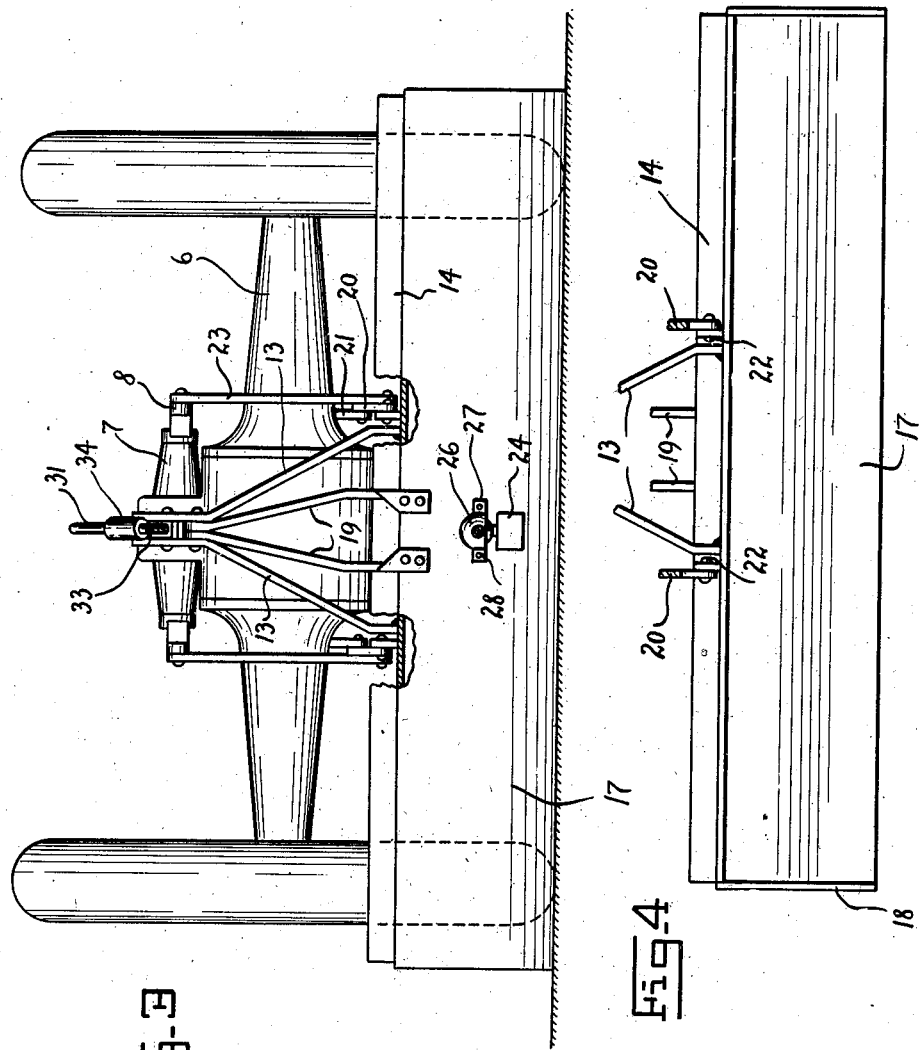

Patented Oct. 14, 1947

2,428,857

REISSUED

UNITED STATES PATENT OFFICE 2,428,857

LAND LEVELER

Fred T. Smith, Cowley, Wyo.

Application April 12, 1946, Serial No. 661,660

1 Claim. (Cl. 37—153)

The present invention relates to new and useful improvements in land levelers designed primarily for use on irrigated farms to level the surface of the soil so that the water may be evenly distributed without causing water to be collected in low areas.

An important object of the present invention is to provide a tractor drawn device of this character by means of which the same may be operatively connected to the hydraulic lift of the tractor to raise the leveler out of contact with the ground while transporting the leveler from place to place.

A further object of the invention is to provide a land leveler of this character including a scraper blade drawn behind the tractor together with a gauge blade drawn behind the scraper blade and adjustable vertically to regulate the depth of the scraper blade.

A still further object of the invention is to provide a device of this character of simple and practical construction, which is efficient and reliable in use, relatively inexpensive to manufacture, which may be easily and quickly attached in operative position to a tractor without necessitating any material changes or alterations therein and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a longitudinal vertical view.

Figure 3 is a transverse sectional view, taken on a line 3—3 of Figure 1.

Figure 4 is a front elevational view of the scraper blade.

Figure 5 is a transverse sectional view taken on a line 5—5 of Figure 1.

Figure 6 is a fragmentary sectional view taken on a line 6—6 of Figure 1.

Referring now to the drawings in detail, wherein for the purpose of illustration I have disclosed a preferred embodiment of invention, the numeral 5 designates a tractor of conventional construction and which includes the rear axle housing 6 and hydraulic lift mechanism 7 from which a pair of lift arms 8 project rearwardly in spaced parallel relation at opposite sides of the mechanism.

Secured to the rear edge of the housing of the lift mechanism 7 between the lift arms 8 is a pair of spaced apart apertured ears 9 to which the front end of a rearwardly extending arm 10 is pivotally connected, the rear end of the arm 10 being pivoted on a pin 12 connecting the upper ends of a pair of bars 13.

The lower ends of the bars 13 extend downwardly in diverging relation and are welded or otherwise fixedly secured to a transversely extending angle iron 14. The angle iron 14 is welded or otherwise suitably secured at the upper edge of a forwardly projecting wing 18 formed at each end of a scraper blade 17. A pair of rearwardly inclined braces 19 extend from the upper connected portion of the bars 13 to the upper edge of the scraper blade 17.

A pair of lower arms 20 have their front ends pivoted to the underside of the axle housing 6 by means of brackets 21 and the rear ends of the arms 20 are pivoted to the angle iron 14 by means of lugs 22.

The rear ends of the lifting arms 8 are connected to the lower arms 20 by pivoted links 23.

A bracket or lug 24 is welded or otherwise suitably secured to the rear of the scraper blade 17 at the center thereof and on which is welded a ball 25 having a split socket 26 swivelly mounted thereon. The edges of the socket 26 are provided with apertured ears 27 connected to each other by bolts 28 for securing the split edges of the socket in position on the ball.

A pair of rearwardly diverging braces 29 have their front ends welded or otherwise suitably secured to the socket 26 and their rear ends similarly secured adjacent the outer ends of the rearwardly curving gauge or drag blade 30 for dragging behind the scraper blade 17.

The gauge blade 30 is vertically adjusted by means of a rod 31 swivelly connected at its rear end to the central portion of the gauge blade 30 by means of a ball and socket joint 32, the rod 31 being inclined upwardly at its front end and formed adjacent its front portion with screw threads 33, threadedly engaged with an internally threaded sleeve 34 swivelly connected to a plate 35 by means of a ball and socket joint 36. The plate 35 is secured to the upper ends of the bars 13. The front end of the rod 31 is formed with a crank handle 37.

In the operation of the device, the scraper blade 17 is drawn behind a tractor 5 whereby high spots in the surface of the soil may be leveled and low spots filled by dumping the soil from the scraper blade 17 therein as the tractor moves over such low spots.

The scraper blade 17, gauge blade 30 and front wheels of the tractor are maintained on a horizontal plane so that as the scraper blade 17 passes over a low spot the dirt will be deposited therein.

When the device is being moved to and from the field, the hydraulic lift arms 8 are raised whereby the lever arms 20 will be swung upwardly to raise the scraper blade 17 and gauge blade 30.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What is claimed is:

In combination with a soil leveler having a transverse scraper blade, a transverse gage blade of substantially the same width as the scraper blade and positioned in rear of the scraper blade, universal means for connecting the gage blade to substantially the center of the scraper blade, whereby the gage blade may pivot in all directions with respect to the scraper blade, and means on the soil leveler for raising and lowering the gage blade with respect to the scraper blade.

FRED T. SMITH.

REFERENCES CITED

The following references are of record in the file of this patent:

UNITED STATES PATENTS

| Number | Name | Date |
| --- | --- | --- |
| 2,192,254 | Beadle | Mar. 5, 1940 |
| 2,359,121 | Kinnan | Sept. 26, 1944 |

FOREIGN PATENTS

| Number | Country | Date |
| --- | --- | --- |
| 559,336 | Great Britain | Feb. 15, 1944 |